United States Patent
Kondo (10) Patent No.: US 10,362,206 B2
(45) Date of Patent: Jul. 23, 2019

(54) IMAGE CAPTURING APPARATUS HAVING A FUNCTION WHICH ASSISTS A PANNING SHOT WITH SPECIFIC FRAMING

(71) Applicant: CANON KABUSHIKI KAISHA, Tokyo (JP)

(72) Inventor: Emi Kondo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 15/682,817

(22) Filed: Aug. 22, 2017

(65) Prior Publication Data

US 2018/0063396 A1 Mar. 1, 2018

(30) Foreign Application Priority Data

Aug. 30, 2016 (JP) ................. 2016-168549

(51) Int. Cl.
*H04N 5/225* (2006.01)
*H04N 5/232* (2006.01)

(52) U.S. Cl.
CPC ....... *H04N 5/2259* (2013.01); *H04N 5/23212* (2013.01); *H04N 5/23245* (2013.01); *H04N 5/23293* (2013.01)

(58) Field of Classification Search
CPC ............. H04N 5/2259; H04N 5/23212; H04N 5/23245; H04N 5/23293
See application file for complete search history.

(56) References Cited

U.S. PATENT DOCUMENTS

| 2007/0110418 | A1* | 5/2007 | Imada | G03B 5/04 396/55 |
| 2009/0219415 | A1* | 9/2009 | Matsunaga | H04N 5/272 348/239 |
| 2010/0007761 | A1* | 1/2010 | Matsunaga | H04N 5/232 348/222.1 |
| 2010/0245630 | A1* | 9/2010 | Kurokawa | H04N 5/232 348/240.99 |
| 2015/0304529 | A1* | 10/2015 | Kawai | G02B 7/34 348/240.3 |

FOREIGN PATENT DOCUMENTS

JP 2015-052735 A 3/2015

* cited by examiner

*Primary Examiner* — Luong T Nguyen
(74) *Attorney, Agent, or Firm* — Venable LLP (57) ABSTRACT

There is provided an image capturing apparatus comprising an image capturing unit. A setting unit sets one of a plurality of focus modes including a manual focus mode (MF mode). A switching unit switches a panning shot assist function between active and inactive. A display control unit carries out control such that first position information indicating a predetermined position in a live view image captured by the image capturing unit is displayed over the live view image in the case where the MF mode is set and the assist function is active, and carries out control such that the first position information is not displayed in the case where the MF mode is set and the assist function is inactive.

10 Claims, 10 Drawing Sheets

FIG. 9C

IMAGE CAPTURING APPARATUS HAVING A FUNCTION WHICH ASSISTS A PANNING SHOT WITH SPECIFIC FRAMING

BACKGROUND OF THE INVENTION

Field of the Invention

The invention relates to an image capturing apparatus, a control method, and a storage medium.

Description of the Related Art

A panning shot is a still image shooting technique that conveys a sense of speed in a moving subject. A panning shot is taken by a user panning his or her camera to follow the motion of the subject, with the aim of obtaining a still image in which the moving subject is still and only the background is blurred. In a typical panning shot, the user sets the shutter speed to be longer than normal, in accordance with the speed at which the subject to be shot is moving. However, if the moving speed of the subject and the panning speed are different, both the subject and the background will be blurry in the resulting image.

Japanese Patent Laid-Open No. 2015-52735 discloses a panning shot shooting assistance function, in an image capturing apparatus having an image stabilizing optical element for image stabilization, that, when a panning shot is taken, controls the image stabilizing optical element such that the optical axis of shooting pivots in the direction of the panning shot being taken.

With panning shots, it is difficult for the user to pan and shoot while ensuring the moving main subject (that is, the subject that is desired to appear still in the captured image) remains in the position desired by the user. Japanese Patent Laid-Open No. 2015-52735 does not disclose assistance for making it easier for the user to execute the panning operation, and a panning shot cannot be taken well if the panning operation itself is largely a failure. It is also not easy to frame a shot such that the main subject appears still in the position desired by the user.

SUMMARY OF THE INVENTION

Having been achieved in light of such circumstances, the present invention provides a technique for assisting a panning shot with specific framing.

According to a first aspect of the invention, there is provided an image capturing apparatus comprising: an image capturing unit; a setting unit configured to set one of a plurality of focus modes including a manual focus mode (MF mode); a switching unit configured to switch a panning shot assist function between active and inactive; and a display control unit configured to carry out control such that first position information indicating a predetermined position in a live view image captured by the image capturing unit is displayed over the live view image in the case where the MF mode is set and the assist function is active, and to carry out control such that the first position information is not displayed in the case where the MF mode is set and the assist function is inactive.

According to a second aspect of the invention, there is provided a control method executed by an image capturing apparatus having an image capturing unit, the control method comprising: setting one of a plurality of focus modes including a manual focus mode (MF mode); switching a panning shot assist function between active and inactive; carrying out control such that first position information indicating a predetermined position in a live view image captured by the image capturing unit is displayed over the live view image in the case where the MF mode is set and the assist function is active; and carrying out control such that the first position information is not displayed in the case where the MF mode is set and the assist function is inactive.

According to a third aspect of the invention, there is provided a non-transitory computer-readable storage medium which stores a program for causing a computer of an image capturing apparatus having an image capturing unit to execute a control method comprising: setting one of a plurality of focus modes including a manual focus mode (MF mode); switching a panning shot assist function between active and inactive; carrying out control such that first position information indicating a predetermined position in a live view image captured by the image capturing unit is displayed over the live view image in the case where the MF mode is set and the assist function is active; and carrying out control such that the first position information is not displayed in the case where the MF mode is set and the assist function is inactive.

Further features of the invention will become apparent from the following description of exemplary embodiments with reference to the attached drawings.

BRIEF DESCRIPTION OF THE DRAWINGS

FIG. 9B is a diagram illustrating an example of an AF method setting screen that is displayed, in the case where LV is on.

DESCRIPTION OF THE EMBODIMENTS

Embodiments of the invention will now be described with reference to the attached drawings. It should be noted that the technical scope of the invention is defined by the claims, and is not limited by any of the embodiments described below. In addition, not all combinations of the features described in the embodiments are necessarily required for realizing the invention.

Figure 1A:
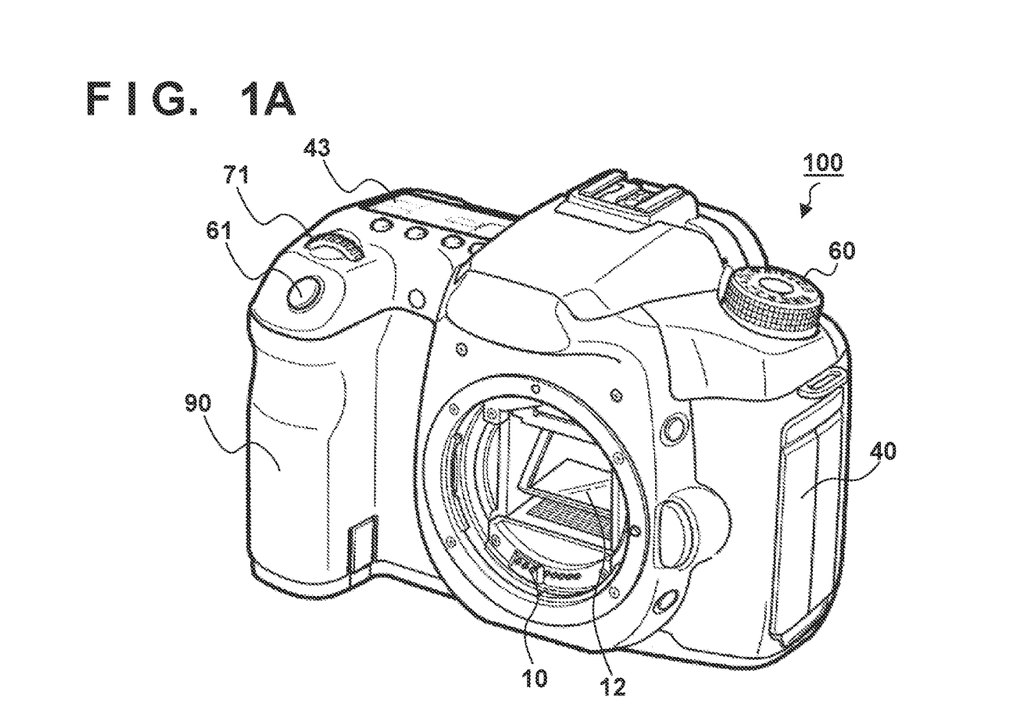
FIG. 1A is a front-side perspective view of a digital camera 100.
Figure 1B:
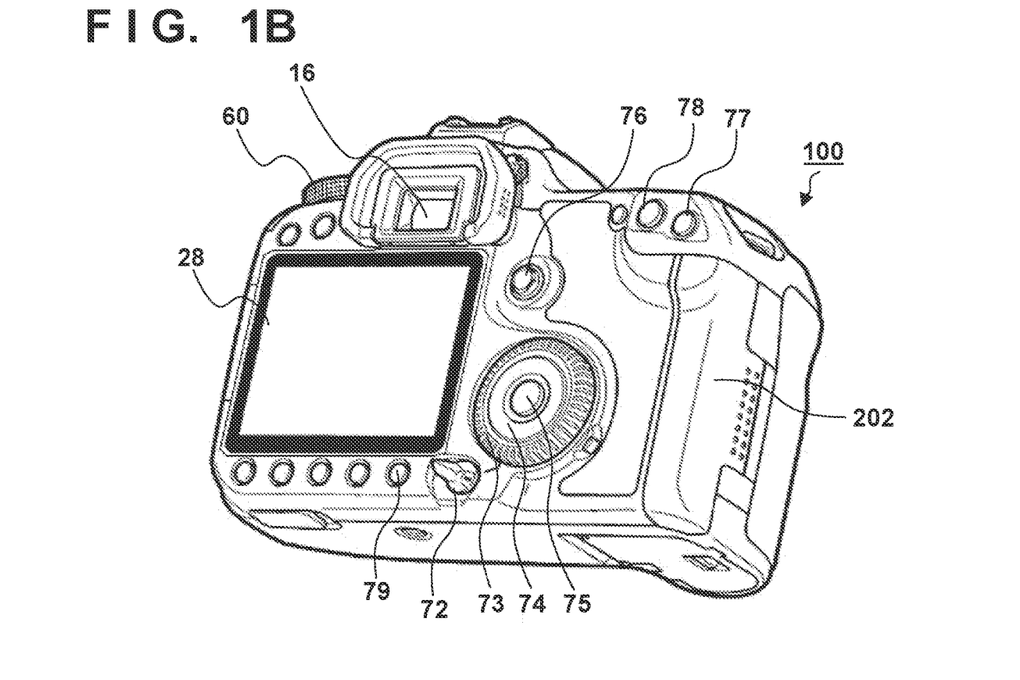
FIG. 1B is a rear-side perspective view of the digital camera 100.

FIGS. 1A and 1B are external views of a digital camera 100 serving as an example of an image capturing apparatus in which the invention can be applied. FIG. 1A is a front-side perspective view of the digital camera 100, and FIG. 1B is a rear-side perspective view of the digital camera 100. In FIGS. 1A and 1B, a display unit 28 is a display unit, provided on a rear surface of the camera, that displays images, various types of information, and so on. A non-viewfinder display unit 43 is a display unit provided on a top surface of the camera, and displays various setting values of the camera such as a shutter speed and an aperture value. A shutter button 61 is an operation unit for making a shooting instruction. A mode change switch 60 is an operation unit for switching among various types of modes. A terminal cover 40 is a cover that protects a connector (not illustrated) for a connection cable that connects the digital camera 100 to an external device, for example. A main electronic dial 71 is a rotational operating member included in an operation unit 70 (described later with reference to FIG. 2). The user can change setting values such as the shutter speed and aperture value, for example, by rotating the main electronic dial 71. A power switch 72 is an operating member that switches the power of the digital camera 100 on and off. A sub electronic dial 73 is a rotational operating member included in the operation unit 70, and is used to move a selection frame, scroll through images, and so on. A cross key 74 is a cross key (four-direction key), included in the operation unit 70, having top, bottom, left, and right parts that can be depressed. When the user depresses a specific part of the cross key 74, an operation corresponding to the depressed part can be made. A SET button 75 is a pushbutton included in the operation unit 70, and is used primarily to finalize selected items and so on. An LV button 76 is a button, included in the operation unit 70, that through a menu button switches a live view ("LV" hereinafter) on and off (displayed/not-displayed). In a moving image shooting mode, the LV button 76 is used to instruct the shooting (recording) of a moving image to start and stop. An enlarge button 77 is an operating button, included in the operation unit 70, for switching an enlarged mode on and off during a live view display ("LV display" hereinafter) in a shooting mode and changing an enlargement amount during the enlarged mode. During a playback mode, the enlarge button 77 functions as an enlarge button for enlarging played-back images and increasing the enlargement amount. A reduce button 78 is a button, included in the operation unit 70, for reducing the enlargement amount of an enlarged played-back image and reducing displayed images. A playback button 79 is an operating button, included in the operation unit 70, that switches between the shooting mode and the playback mode. By depressing the playback button 79 during the shooting mode, the user can switch the digital camera 100 to the playback mode, and cause the newest of the images recorded in a recording medium 200 to be displayed in the display unit 28. A quick-return mirror 12 is moved up and down by an actuator (not illustrated) in response to an instruction from a system control unit 50 (described later with reference to FIG. 2). A communication terminal 10 is a communication terminal for the digital camera 100 to communicate with a (removable) lens. An eyepiece viewfinder 16 is a look-in type viewfinder used by the user to observe a focusing screen 13 (described later with reference to FIG. 2) in order to confirm the focus, framing, and so on of an optical image of a subject obtained through a lens unit 150 (described later with reference to FIG. 2). A cover 202 is a cover for a slot that holds the recording medium 200. A grip part 90 is a holding part shaped to make it easy for the user to hold the digital camera 100 in his or her right hand.

Figure 2:
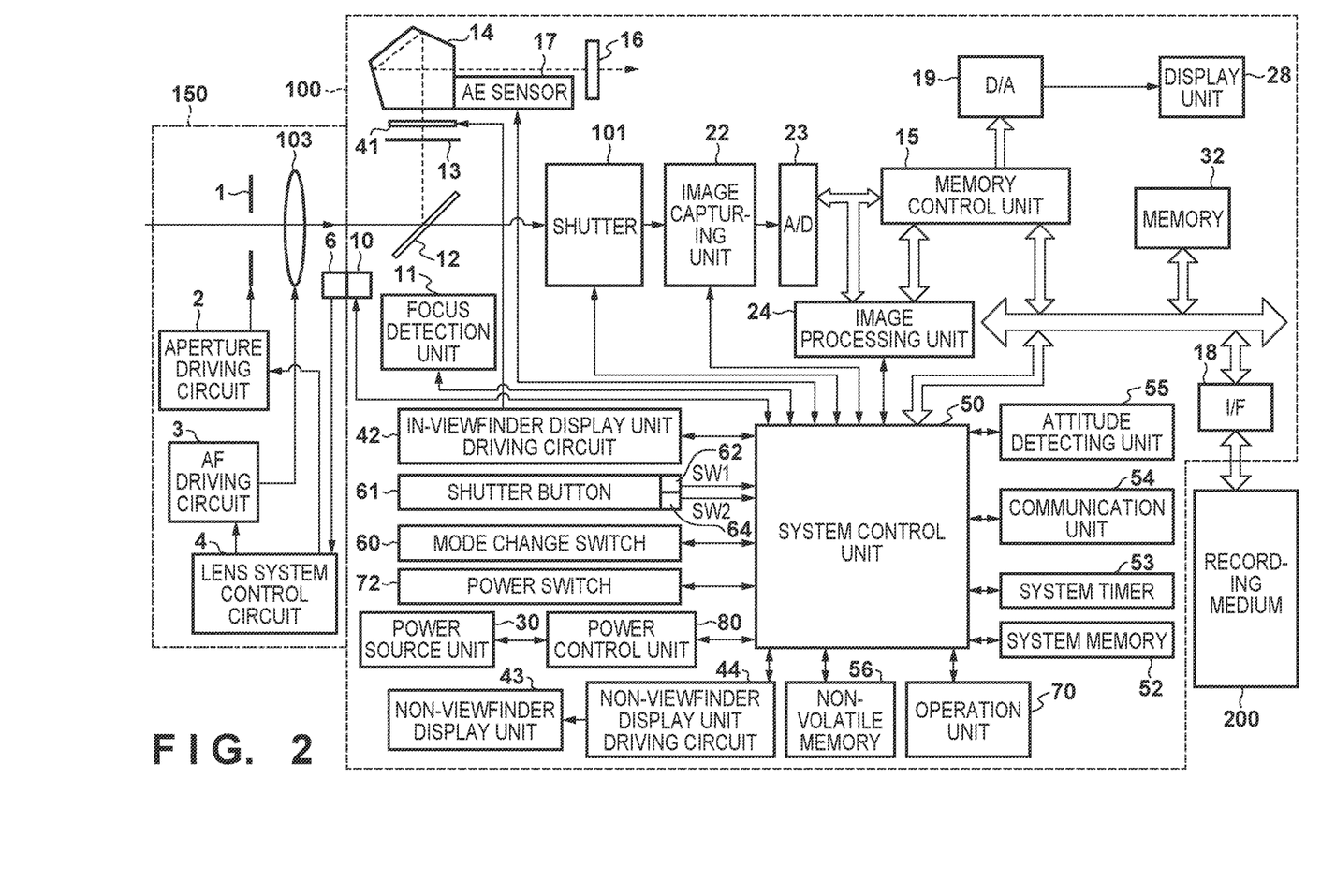
FIG. 2 is a block diagram illustrating an example of the configuration of the digital camera 100.

FIG. 2 is a block diagram illustrating an example of the configuration of the digital camera 100. In FIG. 2, the lens unit 150 is a lens unit provided with an interchangeable shooting lens. A lens 103 is normally constituted of a plurality of lenses, but only a single lens is illustrated here for the sake of simplicity. A communication terminal 6 is a communication terminal for the lens unit 150 to communicate with the digital camera 100, whereas the communication terminal 10 is a communication terminal for the digital camera 100 to communicate with the lens unit 150. The lens unit 150 communicates with the system control unit 50 through the communication terminals 6 and 10. An internal lens system control circuit 4 controls an aperture 1 through an aperture driving circuit 2, and focuses by changing the position of the lens 103 through an AF driving circuit 3.

An AE sensor 17 measures the intensity of the light from a subject passing through the lens unit 150. A focus detection unit 11 outputs defocus amount information to the system control unit 50. The system control unit 50 carries out phase difference AF by controlling the lens unit 150 on the basis of the defocus amount information.

The quick-return mirror 12 is moved up and down by an actuator (not illustrated) in response to an instruction from the system control unit 50 during exposure, LV shooting (live view shooting), and moving image shooting. The quick-return mirror 12 is a mirror for switching a light beam entering through the lens 103 between the eyepiece viewfinder 16 and an image capturing unit 22. The quick-return mirror 12 is normally arranged to reflect the light beam toward the eyepiece viewfinder 16. However, during shooting, LV display, and so on, the quick-return mirror 12 is flipped up, out of the path of the light beam, to guide the light beam to the image capturing unit 22 (mirror-up). Moreover, the quick-return mirror 12 is a half mirror such that a central part of the mirror allows some light to pass therethrough, and that light enters the focus detection unit 11 for the purpose of focus detection.

By observing the focusing screen 13 through a pentaprism 14 and the eyepiece viewfinder 16, the user can confirm the focus, framing, and so on of an optical image of a subject obtained through the lens unit 150.

A shutter 101 is a focal plane shutter that can freely control an exposure time of the image capturing unit 22 under the control of the system control unit 50. The image capturing unit 22 is an image sensor constituted of a CCD, a CMOS sensor, or the like that converts an optical image into an electrical signal. An A/D converter 23 converts analog signals into digital signals. The A/D converter 23 is used to convert analog signals output from the image capturing unit 22 into digital signals.

An image processing unit 24 carries out predetermined pixel interpolation, resizing processing such as reduction, color conversion processing, and the like on data from the A/D converter 23 or data from a memory control unit 15. The image processing unit 24 also performs predetermined computational processing using captured image data, and a system control unit 50 performs exposure control and focus control on the basis of results obtained from these computations. A TTL (through-the-lens) AF (autofocus) process, an AE (automatic exposure) process, and an EF (flash pre-emission) process are carried out as a result. The image processing unit 24 also performs predetermined computational processing using the captured image data, performing a TTL AWB (auto white balance) process on the basis of the results obtained from the computations.

Data output from the A/D converter 23 is written into a memory 32 through the image processing unit 24 and the memory control unit 15, or directly through the memory control unit 15. The memory 32 stores the image data obtained by the image capturing unit 22 and converted into digital data by the A/D converter 23, image data for display in the display unit 28, and the like. The memory 32 is provided with a storage capacity sufficient to store a predetermined number of still images, a predetermined time's worth of moving images and audio, and so on. The memory 32 also functions as an image display memory (a video memory).

A D/A converter 19 converts data for image display, stored in the memory 32, into an analog signal and supplies the analog signal to the display unit 28. Image data for display written into the memory 32 thus is displayed by the display unit 28 via the D/A converter 19 in this manner. The display unit 28 carries out a display in the display device, which is an LCD or the like, based on the analog signal from the D/A converter 19. By using the D/A converter 19 to convert the digital signals A/D converted by the A/D converter 23 and stored in the memory 32 into analog signals and then sequentially transferring and displaying those signals in the display unit 28, the display unit 28 functions as an electronic viewfinder. A through-the-lens image display (LV display) can be carried out as a result.

A frame indicating a range point currently used for autofocus (an AF frame), icons indicating a state of settings in the camera, and so on are displayed in an in-viewfinder display unit 41, using an in-viewfinder display unit driving circuit 42. Various setting values of the camera such as shutter speed and aperture value are displayed in the non-viewfinder display unit 43, using a non-viewfinder display unit control circuit 44.

A non-volatile memory 56 is a memory that can be recorded to and erased electrically, and is constituted by, for example, an EEPROM or the like. Operational constants, programs, and so on of the system control unit 50 are stored in the non-volatile memory 56. Here, "programs" refers to programs for executing the various flowcharts according to the present embodiment, which will be described later.

The system control unit 50 is a control unit having at least one processor, and controls the digital camera 100 as a whole. The system control unit 50 realizes the processes according to the present embodiment, mentioned later, by executing programs recorded in the non-volatile memory 56 mentioned above. The system control unit 50 also carries out display control by controlling the memory 32, the D/A converter 19, the display unit 28, and so on. A system memory 52 is a system memory implemented by RAM or the like. Operational constants and variables of the system control unit 50, programs read out from the non-volatile memory 56, and so on are loaded into the system memory 52.

A system timer 53 is a timer unit that measures times used in various types of control, measures the time of an internal clock, and so on. The mode change switch 60, a first shutter switch 62, a second shutter switch 64, and the operation unit 70 are operating members for inputting various types of operating instructions to the system control unit 50.

The mode change switch 60 switches an operating mode of the system control unit 50 among a still image recording mode, the moving image shooting mode, the playback mode, and so on. An auto capturing mode, an auto scene judgment mode, a manual mode, an aperture priority mode (Av mode), and a shutter speed priority mode (Tv mode) are examples of modes included in the still image recording mode. There are also various scene modes serving as shooting settings for different shooting scenes, a program AE mode, a custom mode, and so on. The digital camera 100 is configured to be capable of switching to any one of these modes directly using the mode change switch 60. Alternatively, the digital camera 100 may be configured such that the mode change switch 60 is used to switch to a screen displaying a list of the shooting modes, after which one of the displayed modes is selected and then switched to using another operating member. Likewise, the moving image shooting mode may also include a plurality of modes.

The first shutter switch 62 switches on partway through the manipulation of the shutter button 61 provided in the digital camera 100, or in other words, when the button is depressed halfway (a shooting preparation instruction), and produces a first shutter switch signal SW1. The system control unit 50 starts operations such as AF (autofocus) processing, AE (automatic exposure) processing, AWB (auto white balance) processing, and EF (flash pre-emission) processing in response to the first shutter switch signal SW1.

The second shutter switch 64 turns on when the shutter button 61 is completely manipulated, or in other words, is fully depressed (a shooting instruction), and produces a second shutter switch signal SW2. The system control unit 50 commences a series of shooting processes, from reading out signals from the image capturing unit 22 to writing image data into the recording medium 200, in response to the second shutter switch signal SW2.

Functions relevant for different situations are assigned to the operating members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. A user can make various types of settings intuitively using the menu screen displayed in the display unit 28, four directional (up, down, left, and right) buttons, a SET button, and so on.

The operation unit 70 includes various operating members, serving as input units for accepting operations from the user. The operation unit 70 includes at least the following operation units: the shutter button 61, the main electronic dial 71, the power switch 72, the sub electronic dial 73, the cross key 74, the SET button 75, the LV button 76, the enlarge button 77, the reduce button 78, and the playback button 79.

A power control unit 80 is constituted of a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200.

A power source unit 30 is a primary battery such as an alkali battery, a lithium battery, or the like, a secondary battery such as a NiCd battery, a NiMH battery, a Li battery, or the like, an AC adapter, and so on. A recording medium I/F 18 is an interface for the recording medium 200 such as a memory card, a hard disk, or the like. The recording medium 200 is a recording medium for recording shot images, such as a memory card or the like, and is constituted by a semiconductor memory, a magnetic disk, or the like.

A communication unit 54 connects to an external device wirelessly or over a hard-wire cable, and sends and receives video signals, audio signals, and the like. The communication unit 54 is also capable of connecting to a wireless local area network (LAN), the Internet, and so on. The communication unit 54 is capable of sending images captured by the image capturing unit 22 (including a through-the-lens image), images recorded in the recording medium 200, and so on, and can also receive image data, other various types of information, and so on from an external device.

An attitude detecting unit 55 detects an attitude of the digital camera 100 relative to the direction of gravity, and detects motion of the digital camera 100. On the basis of the attitude detected by the attitude detecting unit 55, it can be determined whether an image captured by the image capturing unit 22 is an image shot when the digital camera 100 is oriented horizontally or an image shot when the digital camera 100 is oriented vertically. The system control unit 50 can attach orientation information, based on the attitude detected by the attitude detecting unit 55, to the image file of the image captured by the image capturing unit 22, record the image having rotated the image, and so on. Whether the digital camera 100 is panning, tilting, moving forward or backward, and so on can also be determined on the basis of the detection results from the attitude detecting unit 55. An accelerometer, a gyrosensor, or the like can be used as the attitude detecting unit 55.

A method for activating a panning shot assist function in the digital camera 100 will be described next. The digital camera 100 has a panning shot mode as one of the shooting modes that can be switched to using the mode change switch 60. The system control unit 50 activates the panning shot assist function when the shooting mode is set to the panning shot mode. However, the present embodiment is not limited to this configuration. For example, a method in which a panning shot setting screen is provided as one of the setting screens displayed in the display unit 28 and the user is allowed to activate or deactivate the assist function is conceivable as another method of activating the panning shot assist function. A method in which the system control unit 50 detects the state of motion of the digital camera 100 using the attitude detecting unit 55 and activates the panning shot assist function in the case where, for example, the camera is moving at a constant speed in a given direction is also conceivable. Furthermore, a method in which the system control unit 50 uses the LV image (live view image) obtained by processing a signal read out from the image capturing unit 22 to activate the panning shot assist function in the case where the digital camera 100 is moving at a constant speed in a given direction is also conceivable.

Figure 3A:
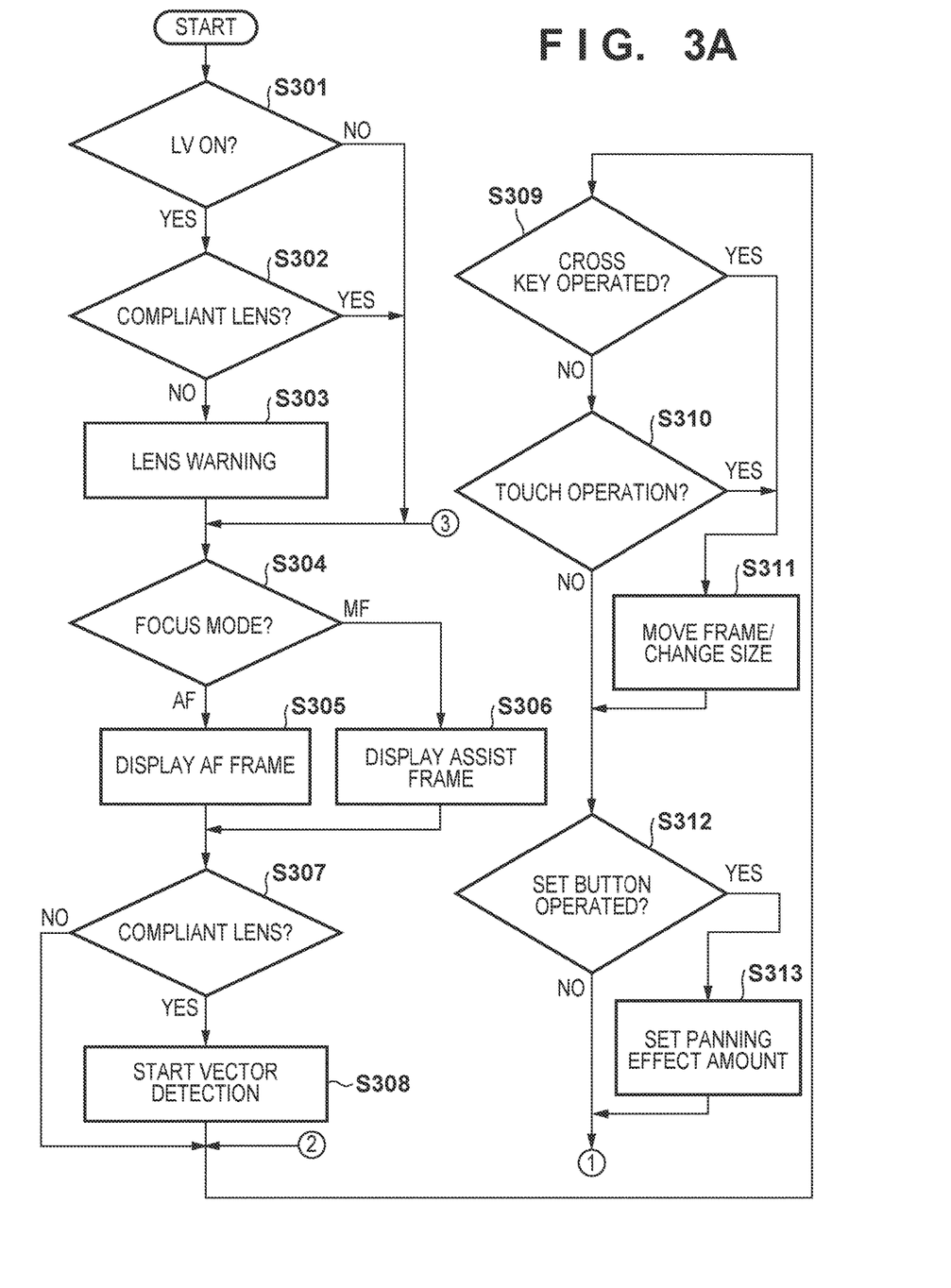
FIGS. 3A and 3B are flowcharts pertaining to control carried out when the digital camera 100 takes a panning shot.
Figure 3B:
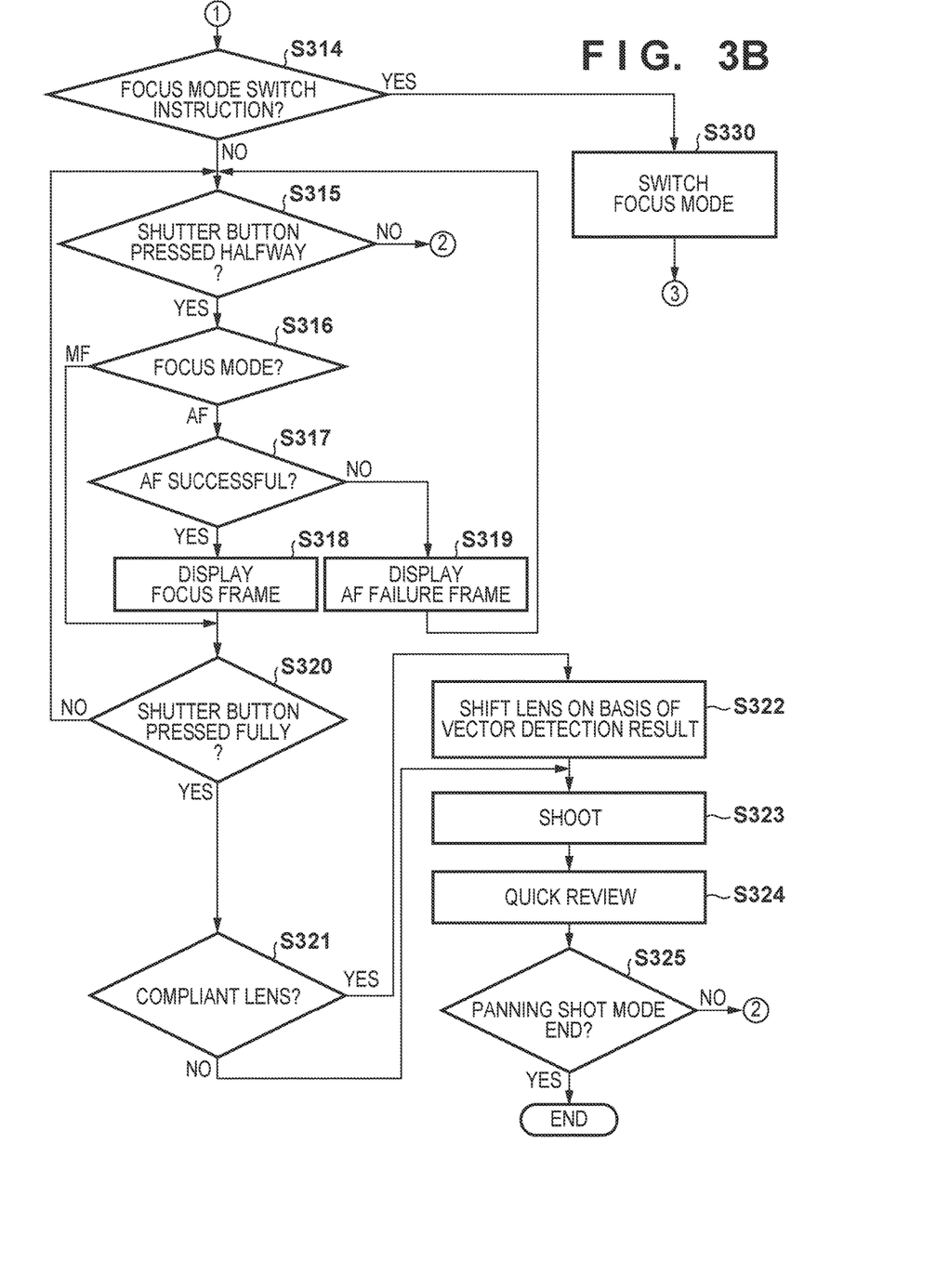

Next, control carried out when the digital camera 100 takes a panning shot will be described using the flowcharts in FIGS. 3A and 3B. The processing of these flowcharts is realized by the system control unit 50 loading a program recorded in the non-volatile memory 56 into the system memory 52 and executing that program. The processing of these flowcharts starts upon the shooting mode of the digital camera 100 being set to the panning shot mode.

In step S301, the system control unit 50 determines whether or not LV is on. LV can be switched on and off using the LV button 76 (see FIG. 1B). In the case where LV is on, the process moves to step S302, whereas when such is not the case, the process moves to step S304. Note that the system control unit 50 may start the LV display in response to the shooting mode being set to the panning shot mode (in other words, in response to the panning shot assist function being set to active).

In step S302, the system control unit 50 determines whether or not the attached lens unit 150 is a panning shot-compliant lens. In the case where the lens unit is a compliant lens, the process moves to step S304, whereas when such is not the case, the process moves to step S303.

Figure 4A:
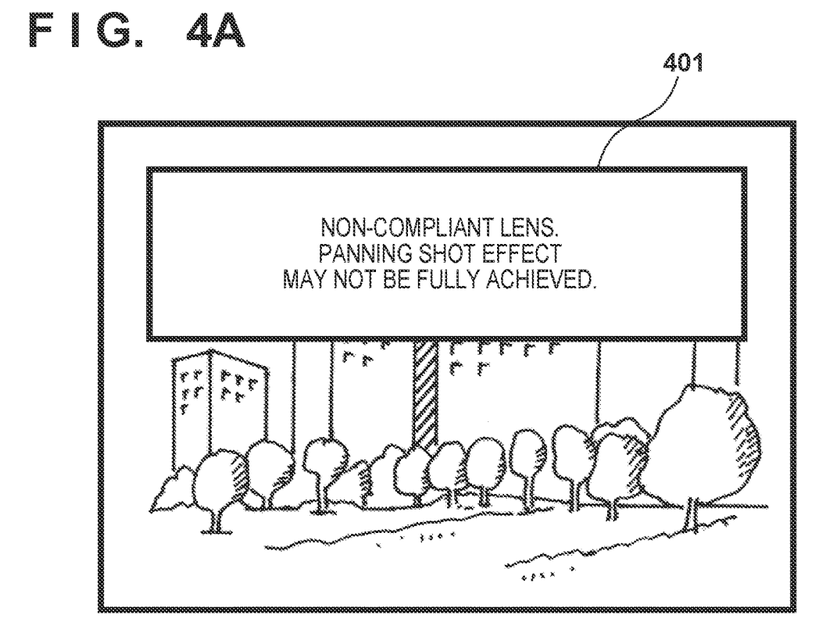
FIG. 4A is a diagram illustrating an example of a warning message that is displayed.

In step S303, the system control unit 50 displays a warning message, indicating that a lens that is not a panning shot-compliant lens is attached, in the display unit 28. FIG. 4A is a diagram illustrating an example of the warning message that is displayed. As indicated in FIG. 4A, the system control unit 50 displays a warning message 401 over the LV image. Displaying the warning message 401 repeatedly can be annoying, and thus the system control unit 50 may be configured to display the warning message 401 only the first time the process has moved to step S302 after the digital camera 100 has been turned on.

In step S304, the system control unit 50 determines whether the focus mode of the digital camera 100 is an AF mode (autofocus mode) or an MF mode (manual focus mode). The process moves to step S305 in the case of the AF mode, and to step S306 in the case of the MF mode.

Figure 5A:
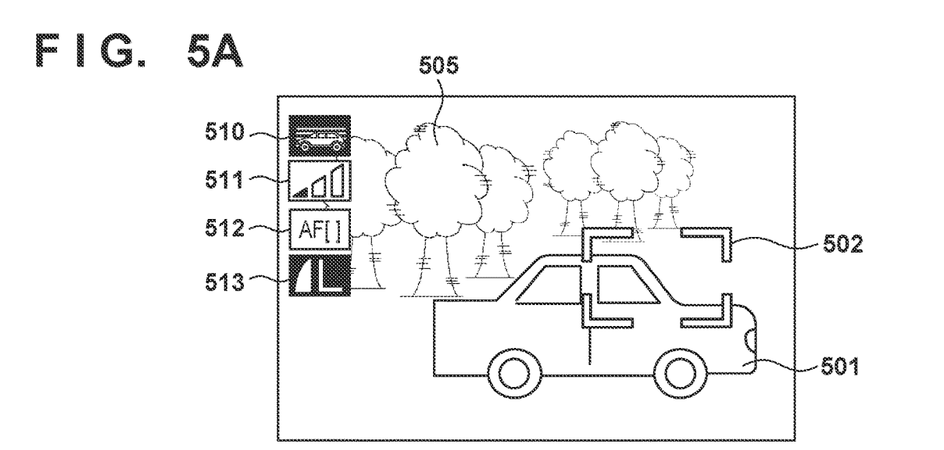
FIG. 5A is a diagram illustrating an example of an AF frame that is displayed.

In step S305, the system control unit 50 displays the AF frame (second position information) indicating an AF target region in the display unit 28. FIG. 5A is a diagram illustrating an example of the AF frame that is displayed. In FIG. 5A, an LV image showing a main subject 501 and a background subject 505 is displayed. In reality, the main subject 501 is moving and the background subject 505 is still. However, in the case of a panning shot, where the camera is panned so that the main subject 501 remains in a constant position, the main subject 501 remains still or in substantially the same position relative to the shooting range, which changes due to the panning, while the background subject 505 moves relative to the shooting range. In a successful panning shot, the main subject 501 will not be blurred, whereas the background subject 505 will be blurred in the direction of the panning during the panning shot. An icon 510 is one type of a shooting mode icon, and is a panning shot icon indicating that the shooting mode of the digital camera 100 is set to the panning shot mode. An icon 511 indicates a setting value currently set as a panning effect amount in the panning shot mode. An icon 512 is a type of a focus mode icon. The icon 512 is an AF mode icon indicating that the focus mode of the digital camera 100 is currently set to the AF mode (autofocus mode) (and to be more specific, that the AF method is set to live zone AF). An icon 513 is a type of display item indicating shooting settings (shooting conditions) set for the digital camera 100, and indicates image quality settings (recording resolution and compression rate) that are currently set. Other information pertaining to the shooting settings may be displayed in addition to those indicated in FIG. 5A. As indicated in FIG. 5A, the system control unit 50 displays an AF frame 502 in the AF target region, over the LV image. The AF frame 502 indicates both an AF detection range and a vector detection range (vector detection will be described later with reference to step S308). In single-point AF, the AF frame is displayed in a position specified as desired by the user (with the center being a default position). In zone AF and large-zone AF, a frame indicating a zone selected by the user (a candidate frame for carrying out AF) is displayed. In step S305, the shooting mode is set to the panning shot mode, and thus a frame indicating a zone selected through zone AF (large-zone AF) is displayed. When AF is carried out in a state where the frame indicating the zone is displayed, the distance to a distance point within the zone is measured, and the AF is carried out so as to focus on a subject determined to be at approximately the same distance.

Figure 5B:
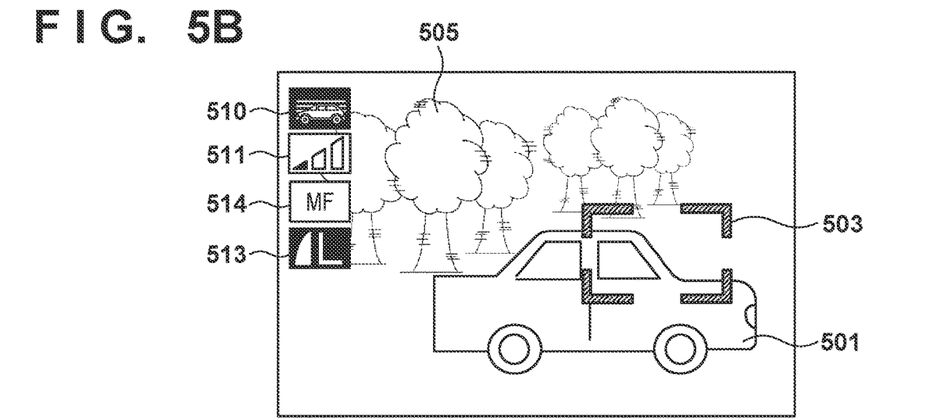
FIG. 5B is a diagram illustrating an example of an assist frame that is displayed.

In step S306, the system control unit 50 displays an assist frame (first position information) in the display unit 28. The assist frame indicates a predetermined position in the live view image. FIG. 5B is a diagram illustrating an example of the assist frame that is displayed. In FIG. 5B, the focus mode is set to the MF mode, and thus an MF mode icon 514, indicating that MF is set, is displayed as the focus mode icon. As indicated in FIG. 5B, the system control unit 50 displays an assist frame 503 in a predetermined region, over the LV image. In the present embodiment, the assist frame 503 is displayed in the same region as the AF frame 502 in step S305. In other words, switching the focus mode to MF when in the state illustrated in FIG. 5A results in the display illustrated in FIG. 5B. The assist frame 503 corresponds to the vector detection range. To clearly indicate to the user that AF will not be carried out, the system control unit 50 gives the assist frame 503 a different appearance from the AF frame 502 displayed in step S305.

Figure 5C:
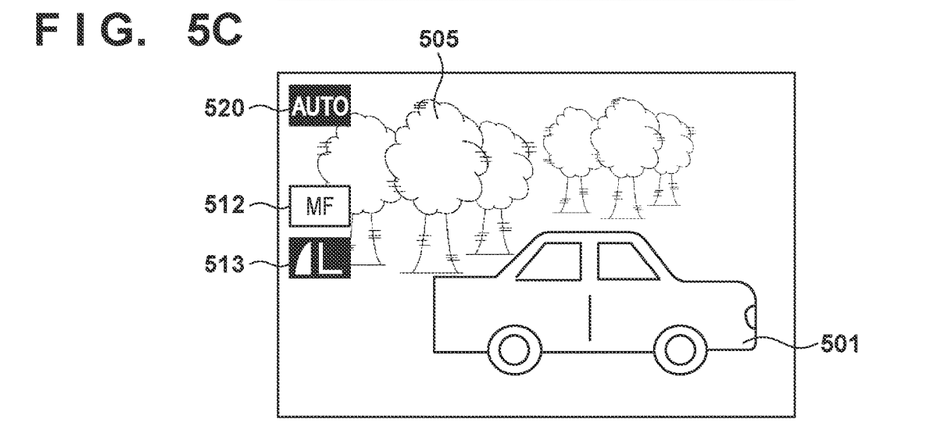
FIG. 5C is a diagram illustrating a state in which the assist frame is not displayed.

Meanwhile, the system control unit 50 does not display the assist frame 503 in the case where the shooting mode is not the panning shot mode (that is, in the case where the panning shot assist function is inactive) while the MF mode is selected as the focus mode. FIG. 5C illustrates an example of the display in the display unit 28 in the case where an auto shooting mode is set, LV is on, and the focus mode is the MF mode, as an example of a case where the shooting mode is not the panning shot mode. An auto icon 520 indicating that the auto shooting mode is set is displayed as the shooting mode icon. The panning shot assist function is inactive, and thus the icon 511 indicating the panning effect amount is not displayed. However, the focus mode is set to the MF mode, and thus the MF mode icon 514 is displayed. The assist frame 503 is not displayed.

In this manner, by displaying the assist frame 503 when the panning shot assist function is active, the system control unit 50 can clearly communicate to the user that the shooting mode is the panning shot mode. Additionally, the assist frame 503 is present within the LV screen, and thus the user can easily capture the main subject on the basis of the position of the assist frame 503. In other words, the user sets the position of the assist frame 503 in advance so as to achieve his or her desired framing (this will be described in detail later with reference to step S311), and then pans the digital camera 100 such that the main subject stays within the assist frame 503. This increases the likelihood that the user will capture the main subject according to his or her desired framing.

Note that in the case where LV is off (not-displayed), the system control unit 50 may display an assist frame (third position information) indicating a predetermined region in the in-viewfinder display unit 41. Generally speaking, vector detection is not possible in the case where the LV is not displayed (the case where LV image capturing is not being carried out), and thus this assist frame is unrelated to the vector detection range. However, the assist frame can assist the user in capturing the main subject according to his or her desired framing. Meanwhile, in the case where the digital camera 100 includes an assist sensor or the like capable of executing vector detection even in the case where the LV is not displayed, the assist frame displayed in the in-viewfinder display unit 41 can also serve as the vector detection range.

Note that the system control unit 50 does not display the assist frame in the in-viewfinder display unit 41 in the case where the shooting mode is not the panning shot mode (in the case where the panning shot assist function is inactive).

In step S307, the system control unit 50 determines whether or not the attached lens unit 150 is a panning shot-compliant lens. In the case where the lens unit is a compliant lens, the process moves to step S308, whereas when such is not the case, the process moves to step S309.

In step S308, the system control unit 50 starts vector detection. Specifically, the system control unit 50 detects the angular velocity of the digital camera 100 currently panning by using an angular velocity sensor included in the attitude detecting unit 55, and detects a motion amount of the subject in an image capturing plane of the image capturing unit 22. The motion amount of the subject is detected on the basis of a plurality of images captured sequentially by the image capturing unit 22. The system control unit 50 then calculates the angular velocity of the subject on the basis of the angular velocity of the digital camera 100 and the motion amount of the subject. A region in which the system control unit 50 detects the motion amount of the subject (a vector calculation range) corresponds to the AF frame displayed in step S305 or the assist frame displayed in step S306.

In step S309, the system control unit 50 determines whether or not the cross key 74 has been operated. In the case where the cross key 74 has been operated, the process moves to step S311, whereas when such is not the case, the process moves to step S310.

In step S310, the system control unit 50 determines whether or not a touch operation has been made on the touch panel of the display unit 28. In the case where a touch operation has been made, the process moves to step S311, whereas when such is not the case, the process moves to step S312. Note that the touch panel of the display unit 28 is included in the operation unit 70.

Figure 6A:
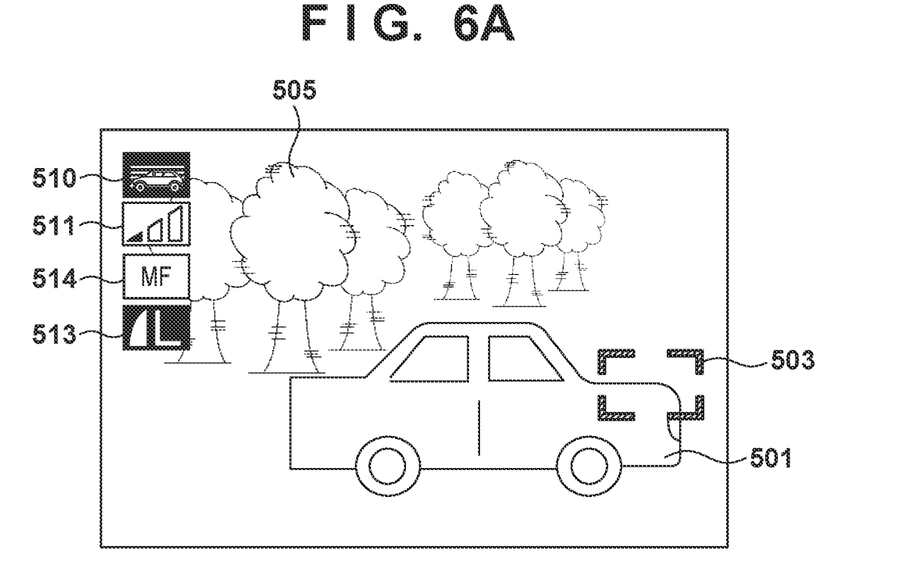
FIGS. 6A and 6B are diagrams illustrating reduction and enlargement of the assist frame.
Figure 6B:
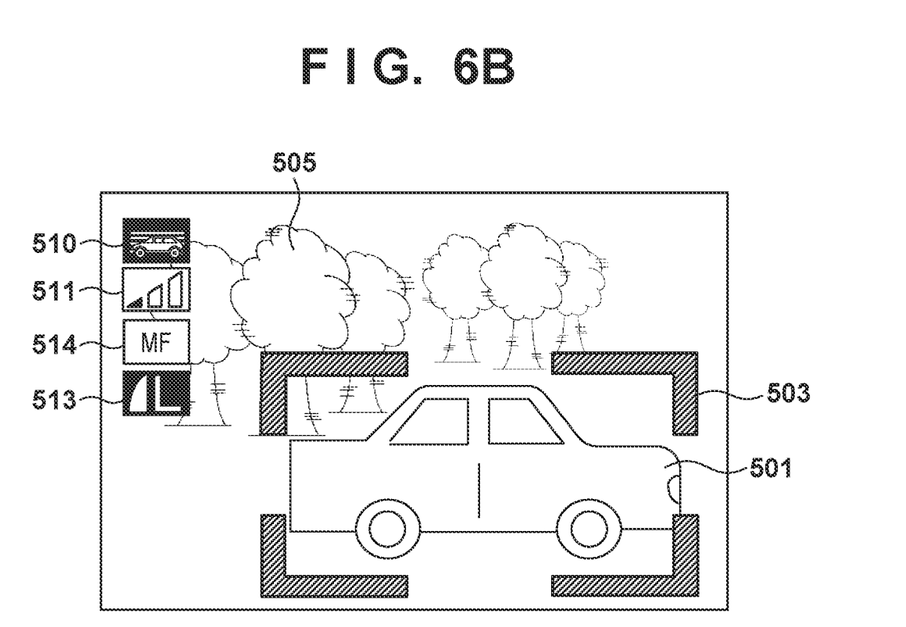

In step S311, the system control unit 50 moves the AF frame or the assist frame in accordance with the direction of the cross key 74 that was pressed or the position where the touch operation was made. The range in which the assist frame can be moved corresponds to a range in which the system control unit 50 can execute the vector detection. Additionally, the system control unit 50 may change the size of the assist frame in accordance with the touch operation. For example, the system control unit 50 reduces the assist frame in the case where a pinch-in operation has been made on the assist frame, and enlarges the assist frame in the case where a pinch-out operation has been made on the assist frame. FIGS. 6A and 6B are diagrams illustrating the reduction and enlargement of the assist frame. In this manner, the system control unit 50 can change at least one of the position and size of the AF frame or the assist frame in response to a user instruction. If, as illustrated in FIG. 6A, the size of the assist frame 503 is reduced and the assist frame 503 is moved to a position at which a leading part of an automobile, which is the main subject 501, is to be captured, the user can pan using the leading part of the automobile as a guide. If, as illustrated in FIG. 6B, the size of the assist frame 503 is increased to match the size of the automobile, and the assist frame 503 is moved to a position at which the entire automobile, which is the main subject 501, is to be captured, the user can pan using the entire automobile as a guide. Note that the configuration may be such that the position of the AF frame or the assist frame can be changed by the user, whereas the size is automatically changed in accordance with a result of detecting the subject.

In step S312, the system control unit 50 determines whether or not the SET button 75 has been operated. In the case where the SET button 75 has been operated, the process moves to step S313, whereas when such is not the case, the process moves to step S314.

Figure 4B:
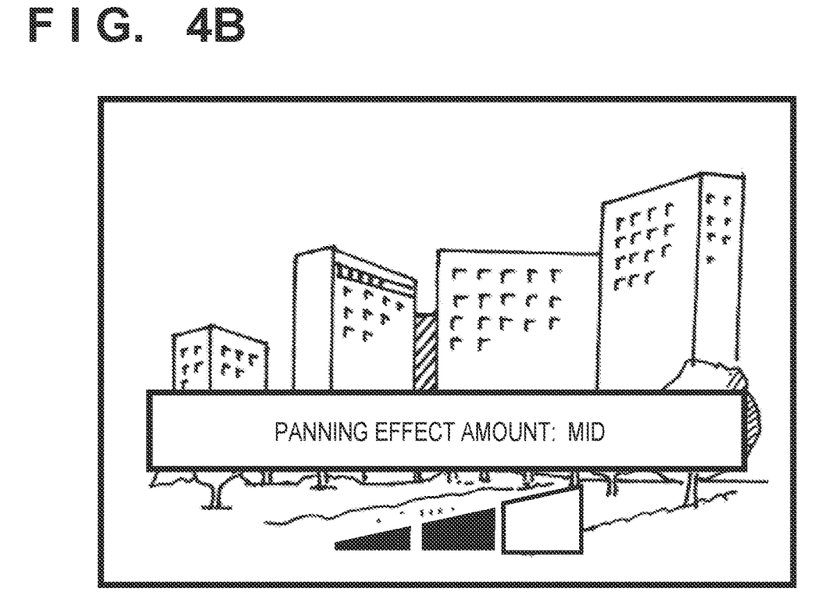
FIG. 4B is a diagram illustrating an example of a panning effect amount setting screen that is displayed.

In step S313, the system control unit 50 displays a panning effect amount setting screen in the display unit 28, and accepts an operation for changing the setting of the panning effect amount from the user. When an operation for changing the setting is made, the panning effect amount selected by the user is saved in the system memory 52. FIG. 4B is a diagram illustrating an example of the panning effect amount setting screen that is displayed. In the example illustrated in FIG. 4B, the setting value currently saved in the system memory 52 is "mid". Although the panning effect amount is indicated as having three levels here, any number of levels may be used. A lower panning effect amount being set results in a lower amount of blur in the background. In other words, the shutter speed becomes short. Conversely, a higher panning effect amount being set results in a higher amount of blur in the background. In other words, the shutter speed becomes long.

In step S314, the system control unit 50 determines whether or not a focus mode switch instruction has been received. The user can make a focus mode switch instruction by, for example, operating a focus switch provided in the lens unit 150 and selecting a focus mode. The lens unit 150 sends the focus mode switch instruction to the system control unit 50 via the communication terminals 6 and 10 in response to the focus switch operation. In the case where the system control unit 50 has received the focus mode switch instruction, the process moves to step S330, whereas when such is not the case, the process moves to step S315. In step S330, the system control unit 50 switches the focus mode in accordance with the focus mode switch instruction, and records the focus mode that has been switched to in the non-volatile memory 56. The process then moves to step S304.

In step S315, the system control unit 50 determines whether or not the shutter button 61 has been pressed halfway. In the case where the shutter button 61 has been pressed halfway, the process moves to step S316, whereas when such is not the case, the process moves to step S309.

In step S316, the system control unit 50 determines whether the focus mode of the digital camera 100 is the AF mode or the MF mode. The process moves to step S317 in the case of the AF mode, and to step S320 in the case of the MF mode.

In step S317, the system control unit 50 executes AF operations in the selected zone, and determines whether or not the AF operations are successful. In the case of a success (that is, in the case where the subject is in focus), the process moves to step S318, whereas in the case of a failure (that is, in the case where the subject is not in focus), the process moves to step S319.

Figure 7A:
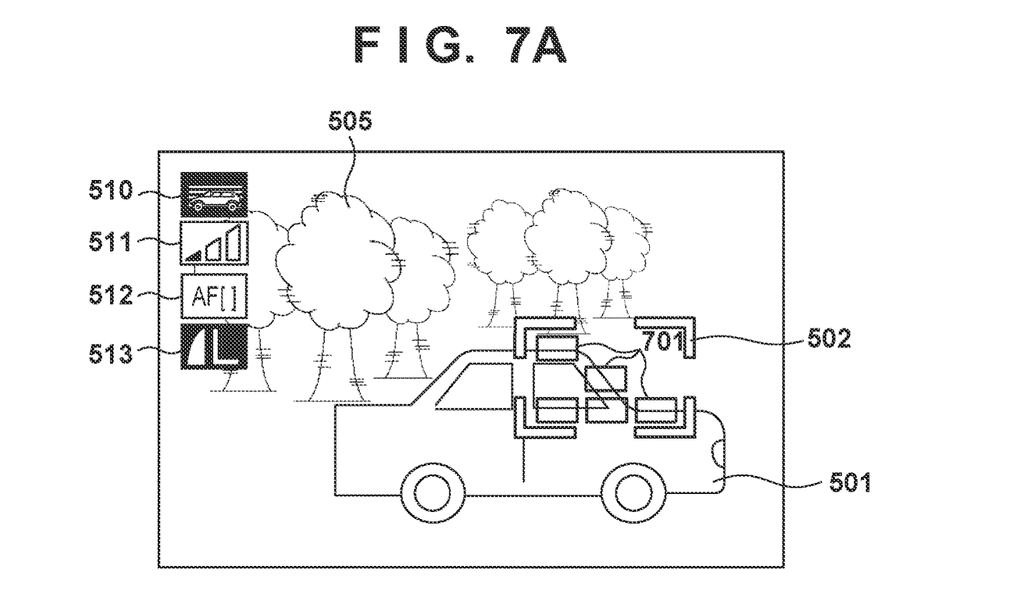
FIG. 7A is a diagram illustrating an example of a focus frame that is displayed.

In step S318, the system control unit 50 displays a frame indicating that the AF is successful (a focus frame) in the display unit 28. FIG. 7A is a diagram illustrating an example of the focus frame that is displayed. In FIG. 7A, a focus frame 701 indicates the position where the AF was carried out in the set zone.

Figure 7B:
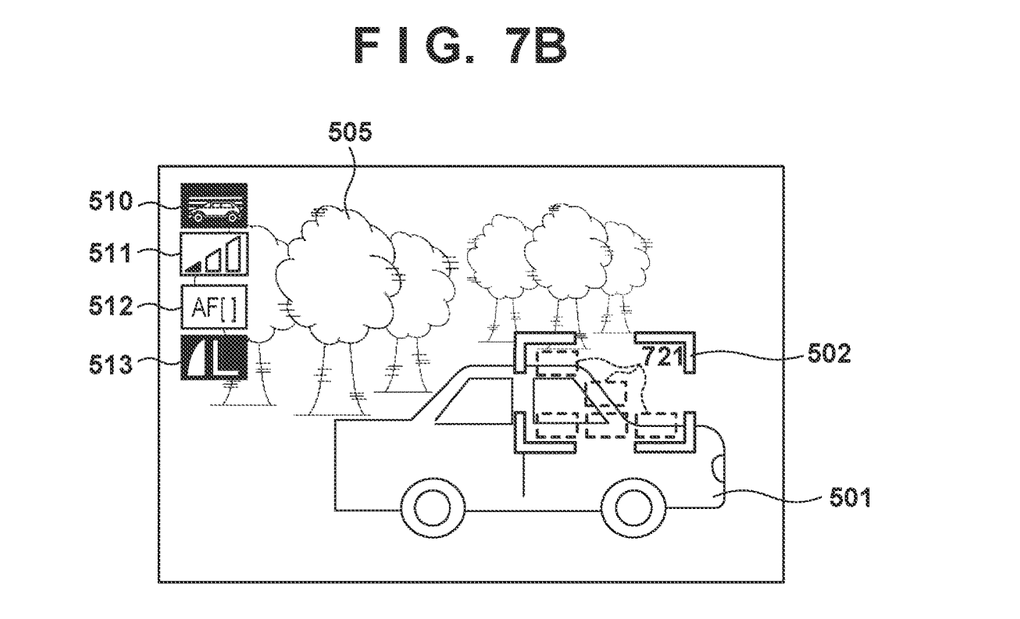
FIG. 7B is a diagram illustrating an example of an AF failure frame that is displayed.

In step S319, the system control unit 50 displays a frame indicating that the AF has failed (an AF failure frame) in the display unit 28. FIG. 7B is a diagram illustrating an example of the AF failure frame that is displayed. In FIG. 7B, an AF failure frame 721 indicates that the AF has failed. The system control unit 50 displays the AF failure frame 721 so as to have a different appearance from the focus frame 701 displayed in step S318 so that the user can clearly recognize whether the AF has succeeded or failed.

In step S320, the system control unit 50 determines whether or not the shutter button 61 has been fully depressed. In the case where the shutter button 61 has been fully depressed, the process moves to step S321, whereas when such is not the case, the process moves to step S315.

In step S321, the system control unit 50 determines whether or not the attached lens unit 150 is a panning shot-compliant lens. In the case where the lens unit is a compliant lens, the process moves to step S322, whereas when such is not the case, the process moves to step S323.

In step S322, the system control unit 50 causes an optical axis shift lens included in the lens 103 of the optical system to shift on the basis of a vector detection result. In other words, on the basis of at least one of the direction of motion of the digital camera 100 determined in accordance with the output of the angular velocity sensor included in the attitude detecting unit 55, and a result of analyzing the LV image at that time, the system control unit 50 extracts a subject moving in the same direction as the camera and determines that subject to be the main subject. The optical axis shift lens is then moved in accordance with a difference between the angular velocity calculated for the main subject and the output of the angular velocity sensor included in the attitude detecting unit 55 (that is, the relative velocities of the panning of the digital camera 100 and the motion of the main subject). A difference between the panning velocity of the digital camera 100 and the moving velocity of the main subject is corrected as a result. This makes it possible to cancel out motion of the main subject in the vector detection range (the AF frame or the assist frame), and suppress blurring of the main subject. The shifting of the optical axis shift lens is repeated during exposure. Note that the system control unit 50 may also move the image capturing unit 22 instead of or in addition to the optical axis shift lens. To rephrase, the system control unit 50 controls the positional relationship between the optical axis and the image capturing unit 22 by moving at least one of the optical axis shift lens and the image capturing unit 22, so as to cancel out motion of the main subject. By doing so, image blur is reduced for the extracted main subject, but arises in the background subject due to the panning so as to appear blurred in one direction, which makes it possible to obtain an image expressing a sense that the main subject is moving.

In step S323, the system control unit 50 carries out a shooting process. Specifically, the system control unit 50 determines the shutter speed on the basis of the panning effect amount set in step S313 and a light metering result. The system control unit 50 uses the image capturing unit 22 to carry out exposure for a time corresponding to the determined shutter speed. As described earlier, in the case where the lens unit 150 is a panning shot-compliant lens, the optical axis shift lens is repeatedly shifted in step S322 during the exposure carried out in step S323.

In step S324, the system control unit 50 displays the image shot in step S323 in the display unit 28. The image is displayed for several seconds, for example.

In step S325, the system control unit 50 determines whether or not a panning shot mode end instruction has been received. The user can make the panning shot mode end instruction by operating the operation unit 70, for example. In the case where the system control unit 50 has received the panning shot mode end instruction, the processing of the flowchart ends. When such is not the case, the process moves to step S309.

Figure 8:
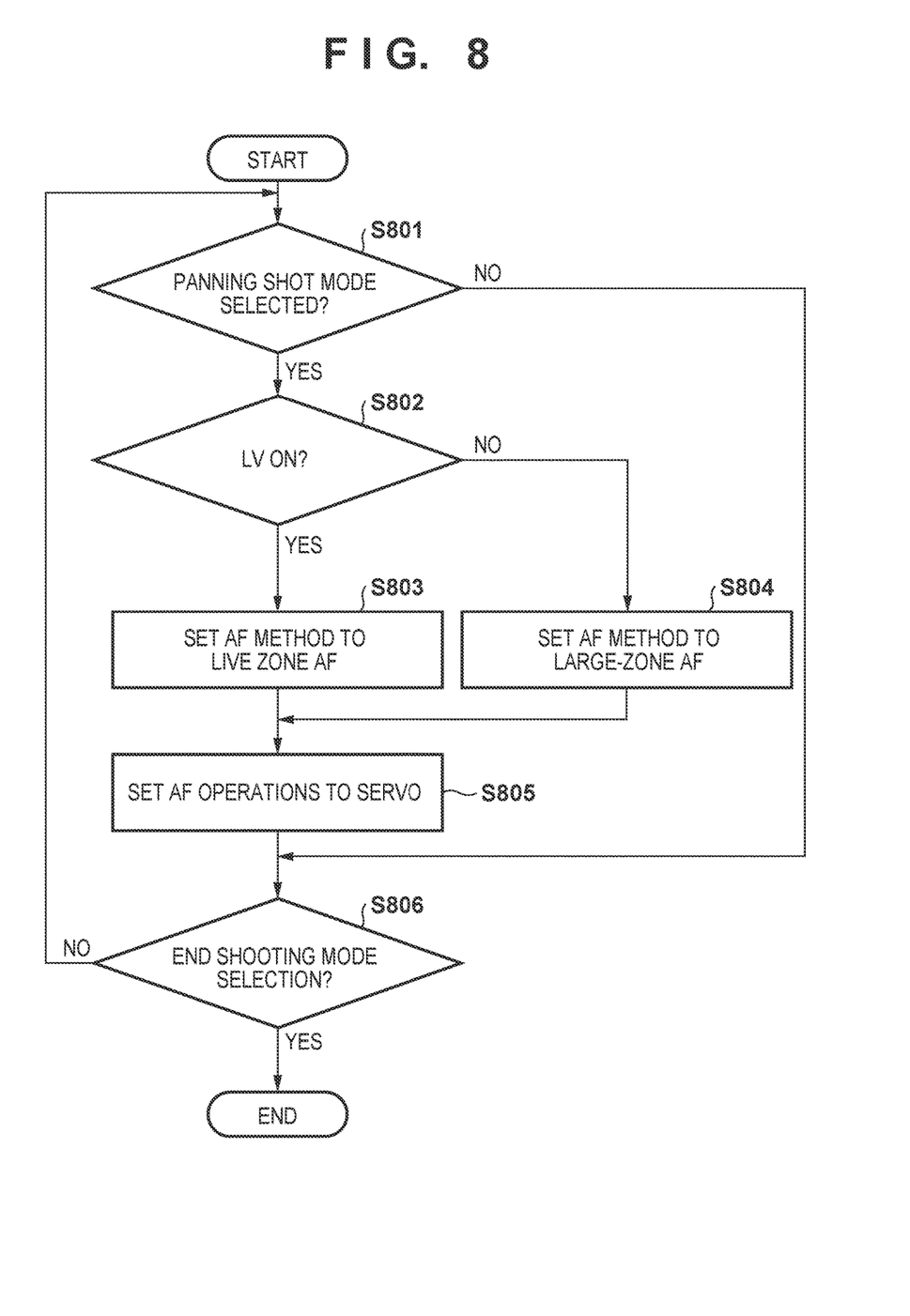
FIG. 8 is a flowchart illustrating in detail a process carried out when setting a panning shot mode.

Next, the processing carried out when the panning shot mode is set will be described in detail with reference to FIG. 8. The processing of this flowchart is realized by the system control unit 50 loading a program recorded in the non-volatile memory 56 into the system memory 52 and executing that program.

Figure 9A:
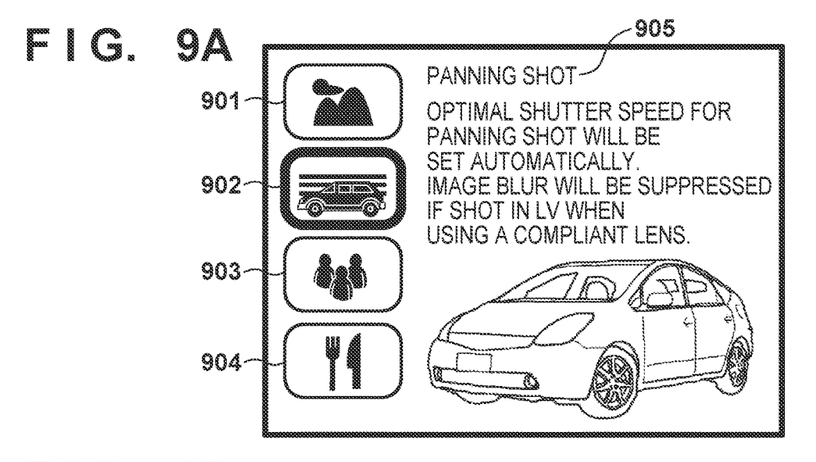
FIG. 9A is a diagram illustrating an example of a shooting mode selection screen that is displayed.

In step S801, the system control unit 50 displays the shooting mode selection screen in the display unit 28, and determines whether or not the panning shot mode has been selected in the shooting mode selection screen. FIG. 9A is a diagram illustrating an example of the shooting mode selection screen that is displayed. As illustrated in FIG. 9A, the shooting mode selection screen includes a landscape mode icon 901, a panning shot mode icon 902, a group photo mode icon 903, and a food mode icon 904. Unlike the other icons, the panning shot mode icon 902 is indicated with a bold frame. This indicates that the panning shot mode icon 902 is currently selected. A message 905 indicates the shooting mode corresponding to the selected icon. The user can confirm the selection by depressing the SET button 75, for example. The system control unit 50 sets the optimal setting values for the shooting mode corresponding to the selected icon as shooting parameters. The AF method, AF operations, and so on can be given as examples of the shooting parameters. The setting values used when the panning shot mode is selected will be described later with reference to steps S803 to S805. In the case where the panning shot mode is selected, the process moves to step S802, whereas when such is not the case, the process moves to step S806.

In step S802, the system control unit 50 determines whether or not LV is on. In the case where LV is on, the process moves to step S803, whereas when such is not the case, the process moves to step S804. LV can be switched on and off using the LV button 76. The system control unit 50 may turn LV on and start the LV display in response to the shooting mode being set to the panning shot mode. This is because the vector detection is carried out in the image capturing plane, and thus the optical axis shift lens can be shifted when LV is on, and image blur caused by the user's panning operation can be suppressed.

In step S803, the system control unit 50 sets the AF method to live zone AF. The setting value is stored in the system memory 52.

In the case where the panning shot mode is not set, and LV is on, one of face+tracking priority AF (face AF), live zone AF, and live single-point AF can be selected as the AF method. However, as described with reference to step S803, the AF method is switched to and fixed at the live zone AF in response to the shooting mode being switched to the panning shot mode, and thus face+tracking priority AF (face AF) and live single-point AF can no longer be selected.

Figure 9B:
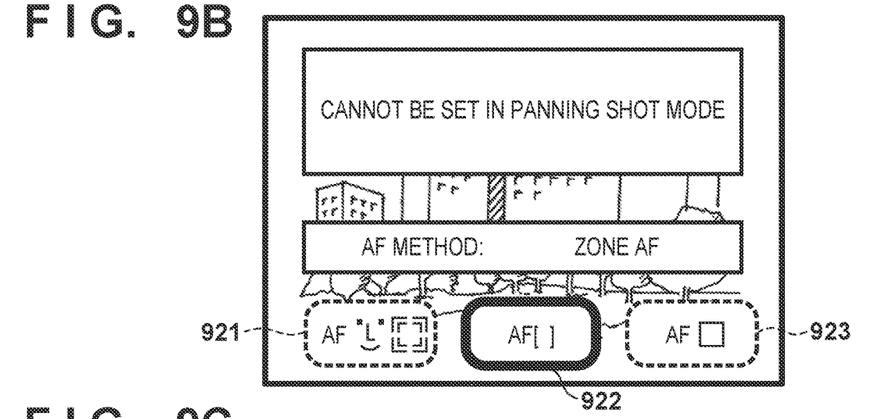

FIG. 9B illustrates an example in which an AF method setting screen is displayed in response to a user operation in the case where the panning shot mode is set and LV is on. The AF method setting screen includes icons 921 to 923. The icon 921 indicates face+tracking priority AF (face AF). In face+tracking priority AF (face AF), the system control unit 50 detects the face of a person present in the LV image and focuses on that face (adjusts the focus). When the face moves, the AF frame (focus position) also moves so as to track the face. When a plurality of faces are detected, left and right arrow marks are displayed at the AF range point (AF frame, focus adjustment position), and the user can change the face on which the AF frame is set by operating the cross key 74. A face or a subject can also be selected by the user through a touch operation. The icon 922 indicates live zone AF. In live zone AF, the system control unit 50 divides the shooting area into a plurality of zones and focuses using the AF frame in a zone selected by the user. The AF frame returns to a center frame upon the SET button 75 being depressed. The icon 923 indicates live single-point AF. In live single-point AF, the system control unit 50 focuses using a single AF frame arranged at a desired position in the LV image in accordance with a user operation. In the example illustrated in FIG. 9B, the panning shot mode is set, and thus the system control unit 50 makes the icons aside from the icon 922 (live zone AF) unselectable, and displays a message explaining that state. This is because in a panning shot, the subject is moving, which makes it difficult to capture the subject in single-point AF and makes live zone AF, in which the subject for AF is detected throughout a wide range, preferable. Note that in the case where a shooting mode aside from the panning shot mode is set (the case where the panning shot assist function is inactive), face+tracking priority AF (face AF) and live single-point AF are selectable. In other words, in the case where a shooting mode aside from the panning shot mode is set (the case where the panning shot assist function is inactive), the AF method setting screen is displayed in a state in which the icon 921 and the icon 923 can also be selected.

In step S804, the system control unit 50 sets the AF method to large-zone AF (desired zone selection). The setting value is stored in the system memory 52. In the case where the panning shot mode is not set and LV is off, one of single-point AF (desired selection), zone AF (desired zone selection), large-zone AF (desired zone selection), and automatic selection AF can be selected as the AF method. However, as described with reference to step S804, the AF method is temporarily switched to large zone AF (desired zone selection) in response to the shooting mode being switched to the panning shot mode. However, another AF method can be switched to in response to a subsequent user operation.

Figure 9C:
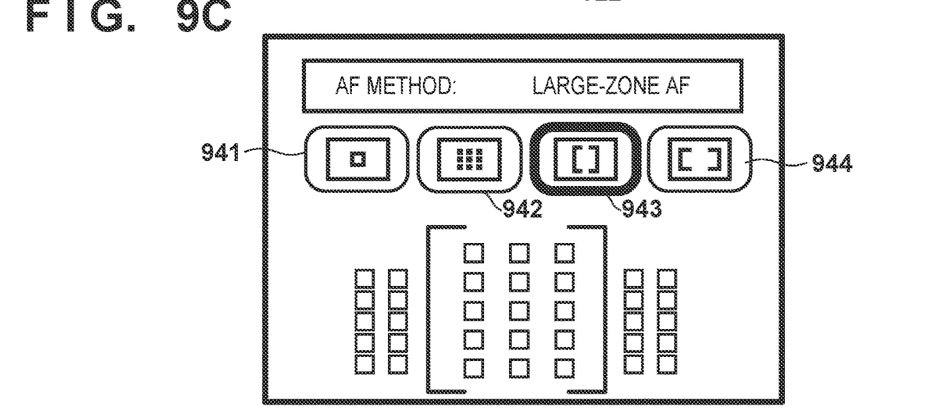
FIG. 9C is a diagram illustrating an example of the AF method setting screen that is displayed, in the case where LV is off.

FIG. 9C illustrates an example in which the AF method setting screen is displayed in response to a user operation in the case where the panning shot mode is set and LV is off. The AF method setting screen includes icons 941 to 944. The icon 941 indicates single-point AF (desired selection). In single-point AF (desired selection), the system control unit 50 selects a single AF frame to use for focusing. The icon 942 indicates zone AF (desired zone selection). In zone AF (desired zone selection), the system control unit 50 allocates AF frames throughout a plurality of focus zones, and then focuses using the AF frames contained within a zone selected by the user. Automatic selection AF is carried out using all the AF frames in the selected zone, which makes focusing easier than with single-point AF, and is also useful when shooting a moving subject. The icon 943 indicates large-zone AF (desired zone selection). In large-zone AF (desired zone selection), the system control unit 50 allocates AF frames throughout a plurality of focus zones, and then focuses using the AF frames contained within a zone selected by the user. In the case of large-zone AF (desired zone selection), there are fewer zone divisions than in zone AF (desired zone selection), and each zone has a larger range. The icon 944 indicates automatic selection AF. In automatic selection AF, the system control unit 50 focuses using all of the AF frames, and then basically focuses on the closest subject. In the case where panning shot mode is set, the system control unit 50 selects the icon 943 (large-zone AF (desired zone selection)) as a default. This is because in a panning shot, the subject is moving, which makes it difficult to capture the subject in single-point AF and makes large-zone AF (desired zone selection), in which AF is detected throughout a wide range, preferable. However, unlike when LV is on, the system control unit 50 sets all of the icons 941 to 944 to be selectable in the case where LV is off (in the case of shooting through the viewfinder). In LV shooting, shooting assistance is provided using lens shift, and thus LV mode tends to be preferred by those who are new to panning shooting. Thus the AF method is limited such that panning shots can be taken easily. However, viewfinder-based shooting may be used by more advanced users, and thus the option to select the desired AF method is provided for such users as well.

In step S805, the system control unit 50 sets AF operations to servo-based operation. The setting value is stored in the system memory 52. In the case where the AF operations are servo-based, the system control unit 50 continues to focus on the subject while the user presses the shutter button 61 halfway. Thus this focus is suited to shooting moving subjects. On the other hand, in the case where the AF operations are one-shot operations, the system control unit 50 will focus only once when the user presses the shutter button 61 halfway. Thus this focus is suited to shooting still subjects. In panning shots, it is desired that the moving subject be kept in focus, and thus the servo setting is better suited for the AF operations.

In step S806, the system control unit 50 determines whether or not the selection of the shooting mode has been instructed to end through the operation unit 70. In the case where the end has been instructed, the processing of this flowchart ends, whereas when such is not the case, the processing returns to step S801. In the case where the panning shot mode has been selected, and a determination of "yes" is made in step S806, the processing of the above-described FIGS. 3A and 3B is started.

According to the embodiment described thus far, in the case where the panning shot assist function is active while the MF mode is selected, the digital camera 100 displays the assist frame indicating a predetermined region (the assist frame 503 indicated in FIG. 5B, for example) over the LV image. The user can then pan the camera while watching the live view, using the assist frame 503 as a guide, to ensure that a moving subject that is to appear still in the image obtained from the panning shot stays within the assist frame 503. In other words, it becomes easy to carry out a panning operation such that the main subject is positioned in a constant position in the shooting range (the image). As a result, the image can be shot such that the relative velocities of the main subject and the camera are reduced at the position of the assist frame 503 in the shooting range (the image). In other words, it becomes easy to make the main subject appear still at the position of the assist frame 503, and easy to take a panning shot with specific framing. Although an example in which the assist frame 503 indicating a region is displayed has been described, it should be noted that the display is not limited to a frame. A mark such as a point, a star shape, or the like may be displayed as long as the display serves as a guide for the position where the main subject is to remain during the panning shot.

Additionally, grid lines such as three parting lines, lines indicating the golden ratio, a safety marker, or the like may be displayed in the display unit 28 over the LV image, in addition to the assist frame 503. However, these grid lines are not display items specifically for assisting panning shots. Thus in the case of a setting for displaying grid lines, it is assumed that the grid lines are displayed regardless of whether or not the shooting mode is the panning shot mode (whether or not the panning shot assist function is active) and regardless of the focus mode. Note that grid lines are a function effective for balancing the framing of a still subject, and are not necessary effective for moving subjects. Thus even in the case where the grid lines are set to be displayed, the grid lines may be made not to be displayed in response to the panning shot mode being set. Conversely, the assist frame 503 is a display item that is not displayed when the panning shot mode is not set but is displayed in response to the panning shot mode being set (in the case of the MF mode).

Note that the various types of control described above as being performed by the system control unit 50 may be carried out by a single piece of hardware, or the control of the apparatus as a whole may be carried out by dividing the processing up among multiple pieces of hardware.

Although the foregoing has described preferred embodiments of the invention, the invention is not intended to be limited to the specific embodiments, and all variations that do not depart from the essential spirit of the invention are intended to be included in the scope of the invention. Furthermore, the above-described embodiments are merely embodiments describing the invention, and the embodiments can be combined as appropriate as well.

Furthermore, although the foregoing embodiment describes an example in which the invention is applied in a digital camera, the invention is not limited to this example, and can be applied in any image capturing apparatus capable of taking a panning shot. In other words, the invention can be applied in a personal computer, a PDA, a mobile telephone terminal, a portable image viewer, or the like having an image capturing function. The invention can also be applied in a digital photo frame, a music player, a game console, an e-book reader, a tablet terminal, a smartphone, or the like having an image capturing function.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168549, filed Aug. 30, 2016 which is hereby incorporated by reference herein in its entirety.

What is claimed is:

1. An image capturing apparatus comprising:
   an image sensor;
   (a) a memory and at least one processor and/or (b) at least one circuit, which function as units comprising:
   (1) a setting unit configured to set one of a plurality of focus modes including a manual focus mode (MF mode);
   (2) a switching unit configured to switch a panning shot assist function between active and inactive; and
   (3) a display control unit configured (i) to carry out control such that first position information indicating a predetermined position in a live view image captured by the image sensor is displayed over the live view image in the case where the MF mode is set and the assist function is active, and (ii) to carry out control such that the first position information is not displayed in the case where the MF mode is set and the assist function is inactive.

2. The image capturing apparatus according to claim 1, wherein the memory and at least one processor and/or at least one circuit further function as units comprising:
   a detecting unit configured to detect motion of a subject in the predetermined position on the basis of a plurality of images sequentially captured by the image sensor; and
   a control unit configured to control a positional relationship between (i) an optical axis of an optical system that conducts light to the image sensor and (ii) the image sensor so as to cancel out the detected motion.

3. The image capturing apparatus according to claim 2, wherein the control unit controls the positional relationship by moving a lens included in the optical system.

4. The image capturing apparatus according to claim 2, wherein:
   the plurality of focus modes includes an autofocus mode (AF mode); and
   in the case where the AF mode is set and the assist function is active:
   (i) the display control unit carries out control such that second position information indicating an AF target region is displayed over the live view image; and
   (ii) the detecting unit detects motion of a subject in the AF target region.

5. The image capturing apparatus according to claim 4, wherein an appearance of the first position information and an appearance of the second position information are different.

6. The image capturing apparatus according to claim 1, wherein:
   the first position information is information indicating a position of a predetermined region in the live view image; and
   the memory and at least one processor and/or at least one circuit further function as a changing unit configured to change at least one of a position and a size of the predetermined region in response to a user instruction.

7. The image capturing apparatus according to claim 1, wherein the display control unit carries out control such that the display of the live view image starts in response to the assist function being switched to active.

8. The image capturing apparatus according to claim 1, wherein:
   the live view image can be switched between being displayed and not being displayed;
   the display control unit carries out control such that third position information indicating the predetermined position is displayed in an in-viewfinder display unit in the case where the live view image is not displayed, the MF mode is set, and the assist function is active; and
   the display control unit carries out control such that the third position information is not displayed in the case where the live view image is not displayed, the MF mode is set, and the assist function is inactive.

9. A control method executed by an image capturing apparatus having an image capturing unit, the control method comprising:
   setting one of a plurality of focus modes including a manual focus mode (MF mode);
   switching a panning shot assist function between active and inactive;
   carrying out control such that first position information indicating a predetermined position in a live view image captured by the image capturing unit is displayed over the live view image in the case where the MF mode is set and the assist function is active; and
   carrying out control such that the first position information is not displayed in the case where the MF mode is set and the assist function is inactive.

10. A non-transitory computer-readable storage medium which stores a program for causing a computer of an image capturing apparatus having an image capturing unit to execute a control method comprising:
    setting one of a plurality of focus modes including a manual focus mode (MF mode);
    switching a panning shot assist function between active and inactive;
    carrying out control such that first position information indicating a predetermined position in a live view image captured by the image capturing unit is displayed over the live view image in the case where the MF mode is set and the assist function is active; and
    carrying out control such that the first position information is not displayed in the case where the MF mode is set and the assist function is inactive.

* * * * *